United States Patent
Kreidler et al.

(10) Patent No.: US 10,003,086 B2
(45) Date of Patent: Jun. 19, 2018

(54) PRIMARY LITHIUM BATTERY HAVING A DME-FREE ELECTROLYTE

(71) Applicant: VARTA Microbattery GmbH, Ellwangen Jagst (DE)

(72) Inventors: Bernd Kreidler, Ellwangen (DE); Hanna Siwek, Ellwangen (DE)

(73) Assignee: Varta Microbattery GmbH (DE)

( * ) Notice: Subject to any disclaimer, the term of this patent is extended or adjusted under 35 U.S.C. 154(b) by 0 days. days.

(21) Appl. No.: 15/619,810

(22) Filed: Jun. 12, 2017

(65) Prior Publication Data

US 2017/0358802 A1    Dec. 14, 2017

(30) Foreign Application Priority Data

Jun. 14, 2016   (EP) ................... 16174349

(51) Int. Cl.
| | |
|---|---|
| *H01M 6/16* | (2006.01) |
| *H01M 4/06* | (2006.01) |
| *H01M 4/38* | (2006.01) |
| *H01M 4/50* | (2010.01) |
| *H01M 4/62* | (2006.01) |

(52) U.S. Cl.
CPC ............ *H01M 6/164* (2013.01); *H01M 4/06* (2013.01); *H01M 4/382* (2013.01); *H01M 4/502* (2013.01); *H01M 4/625* (2013.01); *H01M 6/166* (2013.01); *H01M 2300/004* (2013.01); *H01M 2300/0037* (2013.01)

(58) Field of Classification Search
CPC ........ H01M 6/164; H01M 6/166; H01M 4/06; H01M 4/502; H01M 4/382; H01M 4/625; H01M 2300/004
See application file for complete search history.

(56) References Cited

U.S. PATENT DOCUMENTS

| | | | |
|---|---|---|---|
| 4,401,735 A | 8/1983 | Moses et al. | |
| 4,490,449 A | 12/1984 | Moses et al. | |
| 6,696,200 B1 * | 2/2004 | Yoshimura | H01M 4/131 429/199 |
| 2001/0028980 A1 * | 10/2001 | Yoshimura | H01M 10/0567 429/231.95 |
| 2002/0009644 A1 * | 1/2002 | Yoshimura | H01M 4/134 429/224 |
| 2004/0142247 A1 * | 7/2004 | Yoshimura | H01M 4/134 429/333 |
| 2007/0202409 A1 * | 8/2007 | Yamakawa | H01M 4/5815 429/231.95 |
| 2009/0117461 A1 * | 5/2009 | Shembel | H01M 4/0404 429/217 |
| 2009/0123844 A1 * | 5/2009 | Morigaki | H01M 4/505 429/231.95 |
| 2009/0214950 A1 | 8/2009 | Bowden et al. | |

OTHER PUBLICATIONS

S.I. Tobishima et al., "Ethylene carbonate/ether mixed solvents electrolyte for lithium batteries," Electrochimica Acta, vol. 29, Issue 10, Oct. 1, 1984, pp. 1471-1476 (Abstract).
European Search Report dated Sep. 8, 2016 in corresponding European Application No. 16174349.7.

* cited by examiner

*Primary Examiner* — Laura Weiner
(74) *Attorney, Agent, or Firm* — DLA Piper LLP (US)

(57) ABSTRACT

A DME-free lithium battery includes a positive electrode, a negative electrode, a separator arranged between the positive electrode and the negative electrode, and a liquid electrolyte composed of a solvent and at least one lithium electrolyte salt and with which the electrode and the separator are impregnated, wherein the solvent includes propylene carbonate (PC) as a first solvent component and 1,3-dioxolane (DOL) as a second solvent component, and the positive electrode and/or the negative electrode have a proportion of carbon black having a BET surface area of at least 1 $m^2/g$.

4 Claims, 1 Drawing Sheet

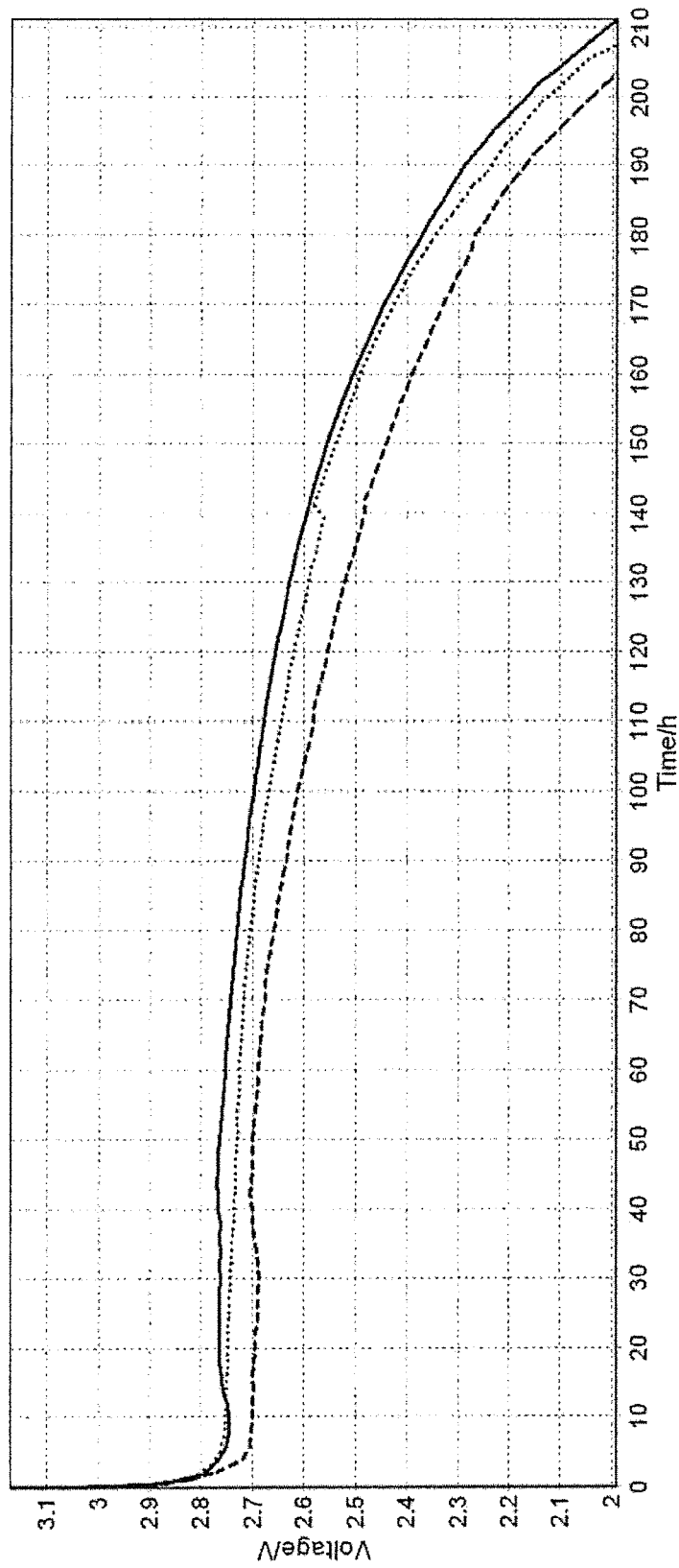

PRIMARY LITHIUM BATTERY HAVING A DME-FREE ELECTROLYTE

TECHNICAL FIELD

This disclosure relates to a lithium battery.

BACKGROUND

The term "battery" originally meant a plurality of electrochemical cells connected in series. However, nowadays, the term "battery" is very frequently, including in the following description, also used to refer to individual electrochemical cells (single cells). Batteries that are not rechargeable are referred to as primary batteries or primary cells.

Lithium batteries are frequently cells that use lithium as active material in the negative electrode. Examples of batteries having a negative lithium electrode are the lithium-thionyl chloride battery, the lithium-sulphur dioxide battery, the lithium-carbon monofluoride battery, the lithium-iron sulphide battery and the lithium-manganese dioxide battery. As a positive electrode, use is made in the last-mentioned lithium-manganese dioxide battery of manganese dioxide electrodes, iron disulphide electrodes in a lithium-iron sulphide battery and, in a lithium-sulphur dioxide battery, sulphur dioxide dissolved in acetonitrile (absorbed in an inert electrode). The positive and negative electrodes of a lithium battery are separated from one another by a separator. This generally allows ion transport between the electrodes. Ion transport is facilitated by use of a suitable electrolyte.

An electrolyte suitable for a lithium battery typically consists of a solvent and a lithium salt having a large anion, for example, lithium hexafluorophosphate.

The solvent consists of two or more solvent components.

As a first solvent component, the solvent generally comprises an organic carbonate, in particular from the group consisting of propylene carbonate (PC), ethylene carbonate (EC) and butylene carbonate (BC), or an ester, in particular from the group consisting of γ-butyrolactone (GBL), ethyl acetate (EA) and methyl formate (MF). This component displays a very high ionic conductivity and a high stability to metallic lithium. However, it is relatively viscous.

As a second solvent component, the solvent comprises, for example, dimethoxyethane (DME), ethyl methyl carbonate (EMC) dimethyl carbonate (DMC) or diethyl carbonate (DEC). Such compounds have a comparatively low viscosity relative to the first component. Their presence thus decreases the overall viscosity of the electrolyte. On the other hand, its ionic conductivity is increased.

DME is particularly suitable as second component for primary lithium batteries. A particularly preferred solvent for primary lithium batteries typically consists of PC and DME. It is used both in button cells and in round cells.

There have for some time been indications that DME is toxic to reproduction. For this reason, the European Chemical Agency (ECHA) has decided to put DME on the "list of substances of very high concern." Accordingly, future approval of DME is uncertain.

It could therefore be helpful to provide primary lithium batteries having electrolyte free of DME. The replacement of DME should as far as possible not be associated with disadvantages concerning the functionality of the electrolyte.

SUMMARY

We provide a DME-free lithium battery including a positive electrode, a negative electrode, a separator arranged between the positive electrode and the negative electrode, and a liquid electrolyte composed of a solvent and at least one lithium electrolyte salt and with which the electrode and the separator are impregnated, wherein the solvent includes propylene carbonate (PC) as a first solvent component and 1,3-dioxolane (DOL) as a second solvent component, and the positive electrode and/or the negative electrode have a proportion of carbon black having a BET surface area of at least 1 $m^2/g$.

We also provide the battery including a positive electrode, a negative electrode, a separator arranged between the positive electrode and the negative electrode, and a liquid electrolyte composed of a solvent and at least one lithium electrolyte salt and with which the electrode and the separator are impregnated, wherein the solvent includes propylene carbonate (PC) as a first solvent component and 1,3-dioxolane (DOL) as a second solvent component, and the positive electrode and/or the negative electrode have a proportion of carbon black having a BET surface area of at least 1 $m^2/g$, wherein the solvent includes the PC in a proportion of 30% by volume to 60% by volume and the DOL in a proportion of 40% by volume to 70% by volume.

We also provide the battery including a positive electrode, a negative electrode, a separator arranged between the positive electrode and the negative electrode, and a liquid electrolyte composed of a solvent and at least one lithium electrolyte salt and with which the electrode and the separator are impregnated, wherein the solvent includes propylene carbonate (PC) as a first solvent component and 1,3-dioxolane (DOL) as a second solvent component, and the positive electrode and/or the negative electrode have a proportion of carbon black having a BET surface area of at least 1 $m^2/g$, wherein the solvent further includes ethylene carbonate (EC) as a third solvent component, and the solvent includes the PC in a proportion of 10% by volume to 60% by volume, the DOL in a proportion of 50% by volume to 70% by volume, and the EC in a proportion of 0% by volume to 50% by volume.

We also provide the battery including a positive electrode, a negative electrode, a separator arranged between the positive electrode and the negative electrode, and a liquid electrolyte composed of a solvent and at least one lithium electrolyte salt and with which the electrode and the separator are impregnated, wherein the solvent includes propylene carbonate (PC) as a first solvent component and 1,3-dioxolane (DOL) as a second solvent component, and the positive electrode and/or the negative electrode have a proportion of carbon black having a BET surface area of at least 1 $m^2/g$, wherein the electrolyte includes lithium perchlorate ($LiClO_4$) as the at least one electrolyte salt, and $LiClO_4$ is present in the electrolyte in a concentration of 5% by weight to 17% by weight.

We further provide the battery including a positive electrode, a negative electrode, a separator arranged between the positive electrode and the negative electrode, and a liquid electrolyte composed of a solvent and at least one lithium electrolyte salt and with which the electrode and the separator are impregnated, wherein the solvent includes propylene carbonate (PC) as a first solvent component and 1,3-dioxolane (DOL) as a second solvent component, and the positive electrode and/or the negative electrode have a proportion of carbon black having a BET surface area of at least 1 $m^2/g$, wherein the positive electrode includes manganese dioxide as an active material, and the negative electrode includes metallic lithium as an active material.

BRIEF DESCRIPTION OF THE DRAWING

FIG. 1 is a graph of battery discharge curves.

DETAILED DESCRIPTION

It will be appreciated that the following description is intended to refer to specific examples selected for illustration in the drawing and is not intended to define or limit the disclosure, other than in the appended claims.

Our lithium batteries comprise, like known lithium batteries, a positive electrode, a negative electrode, a separator arranged between the positive electrode and the negative electrode and a liquid electrolyte composed of a solvent and at least one lithium electrolyte salt and with which the electrode and the separator are impregnated.

The lithium battery is a primary battery, i.e., a battery not intended to be recharged.

The battery is preferably a single cell having precisely one positive electrode and one negative electrode.

In contrast to most known lithium batteries, our batteries are free of DME. More specifically, they have an electrolyte free of DME.

The solvent of the electrolyte comprises PC as a first solvent component and 1,3-dioxolane (DOL) as a second solvent component. Preferably, the solvent of the electrolyte can consist of these two components.

The positive electrode and/or the negative electrode have a proportion of carbon black having a BET surface area of at least 1 $m^2/g$ as determined in accordance with DIN ISO 9277. The carbon black particularly preferably has a BET surface area of 1 $m^2/g$ to 30 $m^2/g$ as determined in accordance with DIN ISO 9277.

The positive electrode and/or the negative electrode preferably contain the carbon black in a proportion of 2 to 10% by weight, preferably 2 to 5% by weight (based on the dry weight of the solid constituents of the electrode). In general, the dry weight of the electrode is made of the weight of the proportion of carbon black and an active material and also, optionally, a binder.

In first experiments, the replacement of DME by DOL resulted in a capacity decrease, even though this was smaller than when using the further second solvent components mentioned at the outset. However, this capacity decrease could surprisingly significantly be reduced by using carbon black having the abovementioned BET values.

Preferably, the solvent comprises the PC in a proportion of 30% by volume to 60% by volume and the DOL in a proportion of 40% by volume to 70% by volume.

Particularly preferably, the proportions of PC and of DOL in the solvent can add up to 100% by volume.

Further preferably, the solvent can comprise ethylene carbonate (EC) as a third solvent component in addition to the PC and the DOL.

We found that the capacity values of our batteries can be improved even further by addition of EC.

In these examples, the solvent preferably comprises PC in a proportion of 10% by volume to 60% by volume and DOL in a proportion of 40% by volume to 70% by volume and EC in a proportion of 0% by volume to 50% by volume.

Particularly preferably, the proportions of PC, DOL and EC in the solvent can add up to 100% by volume.

As the at least one lithium electrolyte salt, the electrolyte particularly preferably comprises lithium perchlorate (LiClO$_4$). The electrolyte salt, in particular the LiClO$_4$, is preferably present in the electrolyte in a concentration of 5% by weight to 17% by weight based on the total weight of the liquid electrolyte which preferably composed of the above discussed solvent and the at least one lithium electrolyte salt.

It can be preferred that the electrolyte of our battery comprises additives. Known examples are propane sultone or vinylene carbonate that can have a stabilizing effect on the electrolytes of lithium ion batteries.

Additives can be present in the electrolyte in a proportion of up to 10% by weight, preferably up to 5% by weight based on the total weight of the liquid electrolyte which is preferably composed of the above discussed solvent and the at least one lithium electrolyte salt and the additives.

Particularly preferably, the positive electrode comprises manganese dioxide as an active material.

The negative electrode of the battery preferably comprises metallic lithium as an active material.

Preferably, the positive electrode and/or the negative electrode contain an electrode binder. This can be, for example, carboxymethylcellulose or a carboxymethylcellulose derivative.

As a separator, our batteries can have, for example, a polyolefin separator.

The features described and also further features of our batteries can be derived from the following description of a preferred example. The example described serves merely for the purpose of illustration and to give a better understanding and are not to be construed as constituting any restriction.

(1) Our Cells

Test cells having a negative electrode composed of metallic lithium and a positive electrode composed of manganese dioxide were impregnated with a DME-free electrolyte composed of a solvent and an electrolyte salt. The solvent consisted of the following components:

43% by volume of PC
57% by volume of DOL.

LiClO$_4$ was used as electrolyte salt. This was added to the solvent in a concentration of 10% by weight.

The positive electrode comprised a proportion of carbon black of 3% by weight in addition to the manganese dioxide. The carbon black had a BET surface area of 2 $m^2/g$ as determined in accordance with DIN ISO 9277.

(2) Reference Cells

Reference cells were manufactured with identical parameters. In the production of the electrolyte, the classical DME was used instead of DOL. The solvent consisted of the following components:

59% by weight of PC
31.2% by weight of DME.

LiClO$_4$ was used as electrolyte salt. This was added to the solvent in a concentration of 9.8% by weight.

The positive electrode comprised a proportion of carbon black of 3% by weight in addition to the manganese dioxide. The carbon black had a BET value of 0.6.

(3) Comparative Studies

In the case of discharge with a resistance of 620Ω, our test cells attained capacity values of 837 to 885 mAh. The measured capacity values for the reference cells were 830 to 857 mAh.

When other commercial solvents, e.g., EMC or GBL, are used instead of DME, we found that significantly lower capacity values are achieved under identical discharge conditions.

The discharge curves of our cell (continuous and dotted line) and a reference cell (broken line) are shown in FIG. 1.

Although the our batteries have been described in connection with specific forms thereof, it will be appreciated that a wide variety of equivalents may be substituted for the specified elements described herein without departing from the spirit and scope of this disclosure as described in the appended claims.

The invention claimed is:

1. A DME-free lithium battery comprising:
a positive electrode,
a negative electrode,
a separator arranged between the positive electrode and the negative electrode, and
a liquid electrolyte composed of a solvent and at least one lithium electrolyte salt comprising lithium perchlorate ($LiClO_4$) present in the electrolyte in a concentration of 5% by weight to 17% by weight,
and with which the electrode and the separator are impregnated,
wherein
the solvent comprises 30-60% by volume propylene carbonate (PC) as a first solvent component and 40-70% by volume 1,3-dioxolane (DOL) as a second solvent component, and
the positive electrode and/or the negative electrode have a proportion of carbon black 1) having a BET surface area of 1 $m^2$/g to 30 $m^2$/g and 2) of 2 to 10% by weight, based on the dry weight of solid constituents of the positive and/or negative electrode.

2. The battery according to claim 1, wherein
the positive electrode comprises manganese dioxide as an active material, and
the negative electrode comprises metallic lithium as an active material.

3. A DME-free lithium battery comprising:
a positive electrode,
a negative electrode,
a separator arranged between the positive electrode and the negative electrode, and
a liquid electrolyte composed of a solvent and at least one lithium electrolyte salt comprising lithium perchlorate ($LiClO_4$) present in the electrolyte in a concentration of 5% by weight to 17% by weight,
and with which the electrode and the separator are impregnated,
wherein
the solvent comprises 10-60% by volume propylene carbonate (PC) as a first solvent component, 50-70% by volume 1,3-dioxolane (DOL) as a second solvent component, and 0-50% by volume ethylene carbonate (EC) as a third solvent component, and
the positive electrode and/or the negative electrode have a proportion of carbon black 1) having a BET surface area of 1 $m^2$/g to 30 $m^2$/g and 2) of 2 to 10% by weight, based on the dry weight of solid constituents of the positive and/or negative electrode.

4. The battery according to claim 3, wherein
the positive electrode comprises manganese dioxide as an active material, and
the negative electrode comprises metallic lithium as an active material.

* * * * *